(12) United States Patent
Akita et al.

(10) Patent No.: US 8,142,294 B2
(45) Date of Patent: Mar. 27, 2012

(54) POWER TRANSMISSION SHAFT AND PROPELLER SHAFT FOR VEHICLE

(75) Inventors: Yasushi Akita, Atsugi (JP); Yoshimichi Takano, Atsugi (JP); Noriyuki Onihashi, Isehara (JP); Hiromichi Komai, Hadano (JP)

(73) Assignee: Hitachi, Ltd., Tokyo (JP)

( * ) Notice: Subject to any disclaimer, the term of this patent is extended or adjusted under 35 U.S.C. 154(b) by 363 days.

(21) Appl. No.: 12/437,701

(22) Filed: May 8, 2009

(65) Prior Publication Data
US 2009/0291765 A1 Nov. 26, 2009

(30) Foreign Application Priority Data
May 21, 2008 (JP) ................................ 2008-132598

(51) Int. Cl.
*F16C 3/02* (2006.01)
(52) U.S. Cl. ........................................ 464/181; 464/182
(58) Field of Classification Search .................. 464/134, 464/181, 182
See application file for complete search history.

(56) References Cited

U.S. PATENT DOCUMENTS

| | | | | |
|---|---|---|---|---|
| 4,211,589 A | * | 7/1980 | Fisher et al. | 464/182 X |
| 4,421,497 A | * | 12/1983 | Federmann et al. | 464/181 |
| 2008/0058108 A1 | * | 3/2008 | Lin et al. | 464/134 |

FOREIGN PATENT DOCUMENTS

| | | | |
|---|---|---|---|
| JP | 5-087117 A | * | 4/1993 |
| JP | 5-180212 A | * | 7/1993 |
| JP | 2001-065538 A | | 3/2001 |
| JP | 2003-184853 A | | 7/2003 |
| JP | 2003-184854 A | | 7/2003 |
| JP | 2004-308700 A | | 11/2004 |

OTHER PUBLICATIONS

Machinery's Handbook, 25th ed., New York, International Press, 1996. pp. 478 & 479. TJ151.M3 1996.*

* cited by examiner

*Primary Examiner* — Gregory Binda
(74) *Attorney, Agent, or Firm* — Foley & Lardner LLP (57) ABSTRACT

A power transmitting shaft includes a coupling member, a cylindrical intermediate member, a tube member and an increased diameter portion. The coupling member connects to a counterpart. The cylindrical intermediate member is on a side of one end of the coupling member and has a mechanical strength larger than that of the coupling member. The tube member has one end portion connected to either one of an inner circumferential portion of the intermediate member and an outer circumferential portion of the intermediate member. The increased diameter portion is on one end portion of the intermediate member which is opposed to the one end of the coupling member in an axial direction of the power transmitting shaft. The increased diameter portion is connected with the one end of the coupling member in the axial direction.

8 Claims, 11 Drawing Sheets

POWER TRANSMISSION SHAFT AND PROPELLER SHAFT FOR VEHICLE

BACKGROUND OF THE INVENTION

The present invention relates to a power transmission shaft, for instance, adapted to transmit a power from a gear shifter to driving wheels of a vehicle, and relates to a vehicular propeller shaft.

Conventionally, there has been proposed an elongated propeller shaft for a vehicle which transmits power from a transmission (or a change-speed gearbox) to a differential gear. The propeller shaft is constituted of two or three parts, and include a tube made of a fiber-reinforced plastic material and Cardan joints coupled to opposite end portions of the tube.

One of the joints includes a yoke that is press-fitted to one of the end portions of the tube, and a sleeve yoke that has one end attached to the side of the transmission and an opposed end connected to the yoke. The other of the joints includes a yoke that is press-fitted to the other of the end portions of the tube, and a flanged yoke that has one end attached to the side of the differential gear and an opposed end connected to the yoke.

The respective yokes include generally fork-shaped yoke bodies and cylindrical intermediate portions that has serrations on an outer circumferential surface thereof. The intermediate portions are connected with end portions of the yoke bodies which are located on a side of the tube. The yoke bodies and the intermediate portions are made of an iron-based metal and integrally formed with each other.

The tube is coupled to the yokes through the serrations by press-fitting the opposite end portions of the tube onto the outer circumferential surfaces of the intermediate portions.

Japanese Patent Application First Publication No. 2003-184853 discloses such a vehicular propeller shaft.

SUMMARY OF THE INVENTION

However, in the respective joints of the propeller shaft of the above-described conventional art, since the yoke bodies and the intermediate portions of the respective yokes are made of the iron-based metal and integrally formed, the propeller shaft has an enhanced torque transmitting performance but undergoes an inevitable increase in weight.

In order to solve the above problem of the propeller shaft of the conventional art, the yoke bodies and the intermediate portions may be made of a light metal material such as aluminum alloy and integrally formed. In such a case, a sufficient rigidity of the yokes cannot be obtained to thereby cause technical problems such as, for instance, deterioration in strength of the serration coupling between the intermediate portions and the tube and reduction of the torque transmitting performance of the propeller shaft.

It is an object of the present invention to provide a power transmission shaft and a vehicular propeller shaft which are improved in reduction of a weight thereof without deterioration in the rigidity.

In one aspect of the present invention, there is a power transmitting shaft that includes a coupling member, a cylindrical intermediate member, a tube member and an increased diameter portion. The coupling member is connected to a counterpart. The cylindrical intermediate member is on a side of one end of the coupling member and has a mechanical strength larger than that of the coupling member. The tube member includes one end portion connected to either one of an inner circumferential portion of the intermediate member and an outer circumferential portion of the intermediate member. The increased diameter portion is on one end portion of the intermediate member which is opposed to the one end of the coupling member in an axial direction of the power transmitting shaft. The increased diameter portion is connected with the one end of the coupling member in the axial direction.

In a further aspect of the present invention, there is a propeller shaft for a vehicle that includes a yoke, a tube member, a cylindrical intermediate member, a flange and a serration portion. The yoke is made of an aluminum alloy. The tube member is made of a fiber-reinforced plastic material. The cylindrical intermediate member is between the yoke and the tube member and made of an iron based metal. The flange is on a side of one end of the intermediate member which is located on a side of the yoke. The serration portion is formed on the intermediate member. The tube member is coupled to the intermediate member through the serration portion. The flange is integrally connected with a tip end of the yoke which is located on a side of the intermediate member in an axial direction of the propeller shaft by friction-pressure welding or diffusion welding.

In a still further aspect of the present invention, there is a propeller shaft for a vehicle that includes a yoke, a tube member and a cylindrical intermediate member. The yoke is made of an aluminum alloy. The tube member is made of a fiber-reinforced plastic material. The cylindrical intermediate member is made of an iron-based metal and has a yoke connecting portion at one end portion thereof which is connected with the yoke, and a tube connecting portion at the other end portion thereof which is connected with the tube member. The yoke connecting portion has a diameter larger than a diameter of the tube connecting portion and a diameter of a connecting portion of the yoke which is connected to the yoke connecting portion of the intermediate member.

Other objects and features of this invention will become understood from the following description with reference to the accompanying drawings.

DETAILED DESCRIPTION OF THE INVENTION

Embodiments of the present invention will be explained hereinafter with reference to the accompanying drawings. In the embodiments, a power transmitting shaft is applied to a propeller shaft for a vehicle.

First Embodiment

Figure 1:
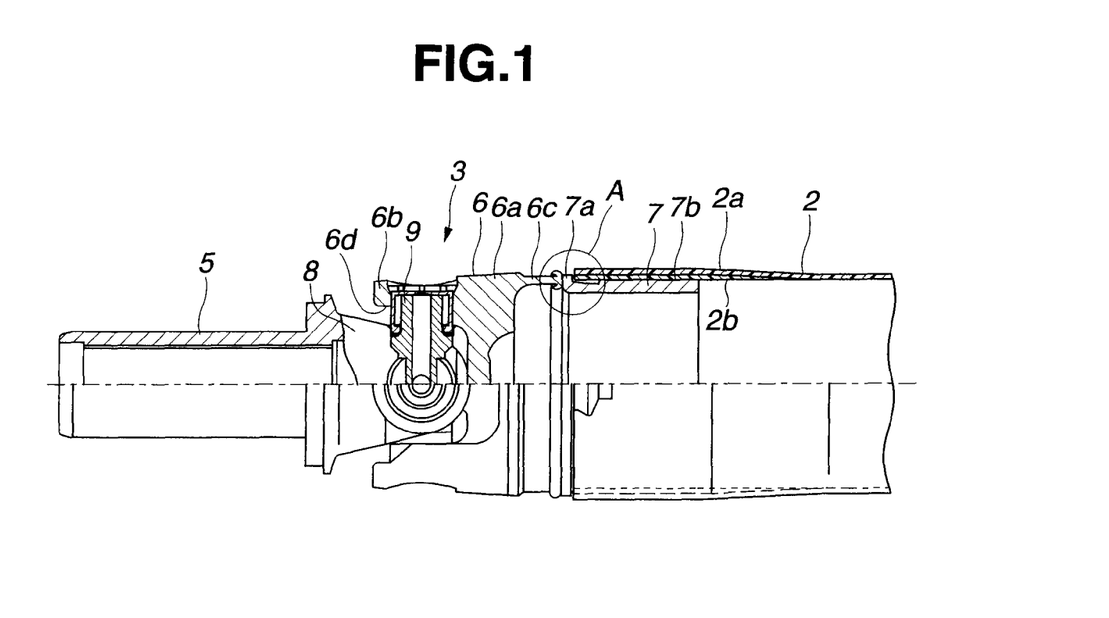
FIG. 1 is a diagram showing an essential part of a propeller shaft according to a first embodiment of the present invention, in which an upper half shows a cross section taken in a longitudinal direction of the propeller shaft.
Figure 2:
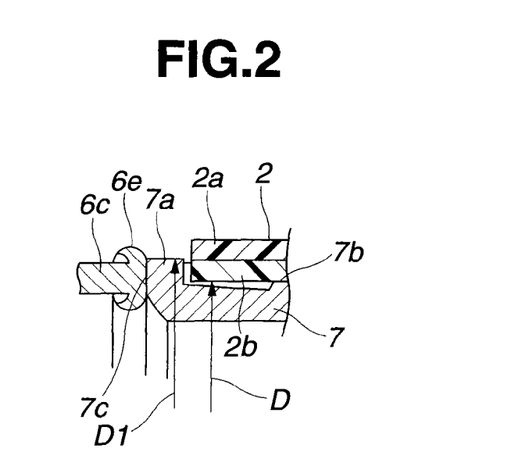
FIG. 2 is an enlarged view of circled part A shown in FIG. 1.
Figure 3:
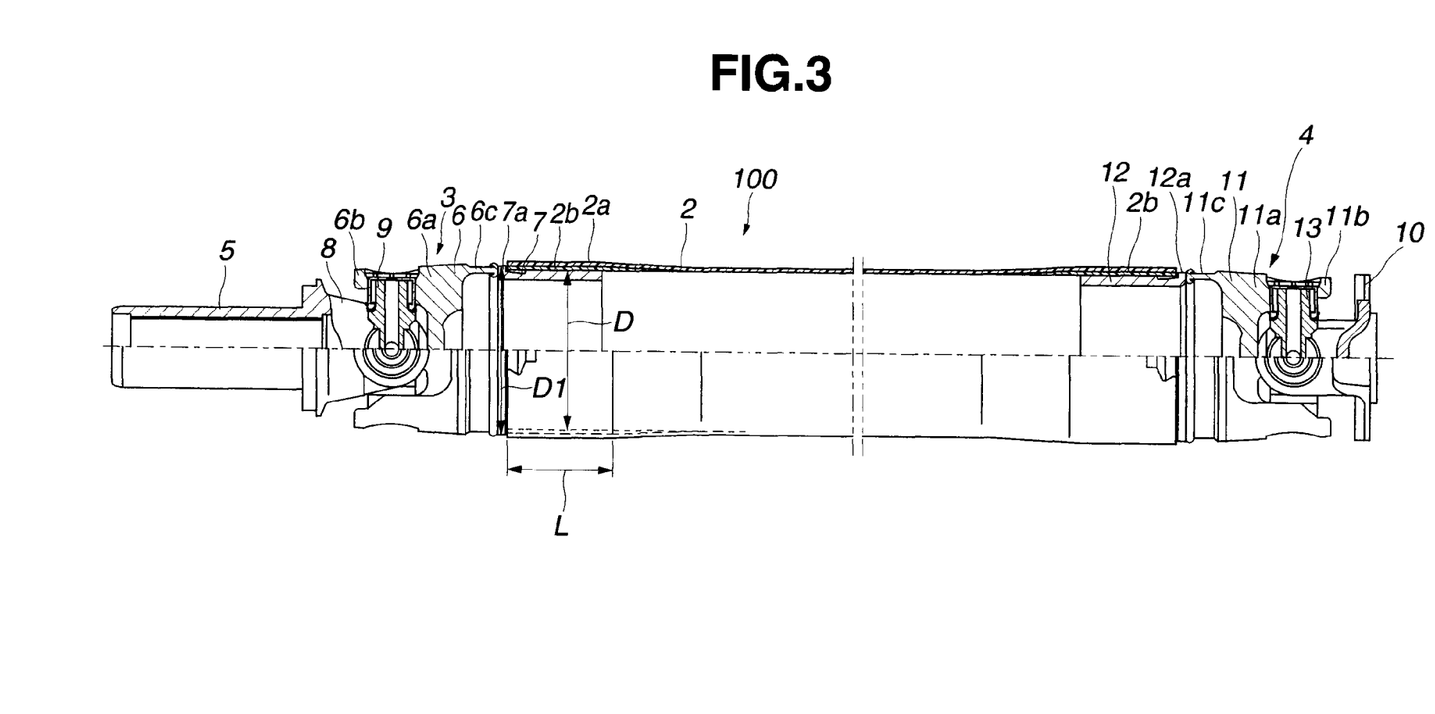
FIG. 3 is a diagram showing the propeller shaft according to the first embodiment, in which an upper half shows a cross section taken in the longitudinal direction of the propeller shaft.

Referring to FIG. 1 to FIG. 4, propeller shaft 100 according to a first embodiment of the present invention is explained. As shown in FIG. 3, propeller shaft 100 for a vehicle is of a so-called two-joint type. Propeller shaft 100 includes elongated cylindrical tube member 2, first joint 3 that is disposed at one end portion of tube member 2 and connected to a side of a transmission (not shown) as a first counterpart, and second joint 4 that is disposed at the other end portion of tube member 2 and connected to a side of a differential gear (not shown) as a second counterpart.

Tube member 2 has a multi-layer structure at both axial end portions thereof. In this embodiment shown in FIG. 1 and FIG. 2, tube member 2 has a two-layer structure at both axial end portions thereof. Specifically, the two-layer structure of the axial end portions of tube member 2 includes outer tube 2a as an outer circumferential layer and inner tube 2b as an inner circumferential layer which is disposed on an inner circumferential side of outer tube 2a, respectively. The whole tube member 2 is made of a fiber-reinforced plastic material.

First joint 3 is Hooke's joint (Cardan joint) and connects the one end portion of tube member 2 with cylindrical slip joint 5 that is disposed on the side of the transmission (that is, on a front side). First joint 3 includes first yoke 6 as a coupling member which is coupled to the one end portion of tube member 2, first intermediate member 7 that is integrally connected to first yoke 6 and press-fitted to an inner circumferential surface of the one end portion of tube member 2, sleeve yoke 8 that is integrally formed with slip joint 5, and cruciform spider 9 that connects first yoke 6 and sleeve yoke 8 to each other.

Second joint 4 includes flange yoke 10 that is coupled to the differential gear, second yoke 11 as a coupling member which is coupled to the other end portion of tube member 2, second intermediate member 12 that is integrally connected to second yoke 11 and press-fitted to an inner circumferential surface of the other end portion of tube member 2, and cruciform spider 13 that connects flange yoke 10 and second yoke 11 to each other.

First joint 3 including first yoke 6 and first intermediate member 7 and second joint 4 including second yoke 11 and second intermediate member 12 are substantially the same in basic construction. Therefore, detailed explanations for first joint 3 are given hereinafter, and those for second joint 4 are omitted.

As shown in FIG. 1, first yoke 6 includes solid and annular-shaped central base 6a, fork portion 6b that is disposed at one end portion of central base 6a (that is, on a side of slip joint 5), and cylindrical portion 6c that is disposed at an opposed end portion of central base 6a (that is, on a side of first intermediate member 7). First yoke 6 as a whole is made of a light metal, specifically, an aluminum alloy in this embodiment, and configured to have a diameter larger than the conventional yoke made of an iron-based metal. Fork portion 6b is bifurcated to define two legs in which insertion bores 6d are formed. Insertion bores 6d are diametrically opposed to each other in a radial direction of first yoke 6 and extend through the respective legs of fork portion 6b. Spider 9 is inserted into insertion bores 6d of fork portion 6b. Cylindrical portion 6c has a small entire thickness and has a tip end portion that is integrally connected with first intermediate member 7 in an axial direction of propeller shaft 100 by friction-pressure welding as explained later. The tip end portion of cylindrical portion 6c is formed with resultant curl portion 6e by the process of the friction-pressure welding.

First intermediate member 7 is made of an iron-based metal, thereby having a mechanical strength larger than that of first yoke 6. As shown in FIG. 2, first intermediate member 7 has a cylindrical shape and outer diameter D slightly smaller than an outer diameter of cylindrical portion 6c. First intermediate member 7 has length L that is set so as to obtain a sufficient connecting force at a connecting portion in which first intermediate member 7 and the one end portion of tube member 2 are connected to each other by press-fitting as explained later. First intermediate member 7 includes an increased diameter portion that is increased in outer diameter and formed by first flange 7a. First flange 7a is integrally formed with first intermediate member 7 and extends in a radially outward direction of first intermediate member 7. First flange 7a is disposed on a side of the tip end portion of cylindrical portion 6c (i.e., on the side of the transmission). Specifically, first intermediate member 7 includes a cylindrical body and first flange 7a that extends from the cylindrical body in a radially outward direction of the cylindrical body. First flange 7a is bent relative to the cylindrical body in the radially outward direction of first intermediate member 7. First flange 7a has outer diameter D1 substantially equal to an outer diameter of inner tube 2b (i.e., an inner diameter of outer tube 2a) as shown in FIG. 2. Outer diameter D1 of first flange 7a may be not larger than an inner diameter of outer tube 2a (i.e., an inner diameter of an outer-most circumferential layer of the multi-layer structure).

First intermediate member 7 further includes serration portion 7b that is formed along an axial direction of first intermediate member 7 over a substantially entire outer circumferential surface of first intermediate member 7 except for first flange 7a and a periphery of first flange 7a. The one end portion of tube member 2 is press-fitted onto first intermediate member 7 in the axial direction and connected to first intermediate member 7 through serration coupling between an inner circumferential surface of tube member 2 (i.e., an inner circumferential surface of inner tube 2b) and serration portion 7b of first intermediate member 7. Thus, the one end portion of tube member 2 and first intermediate member 7 are connected to each other through the serration coupling.

Further, first flange 7a of first intermediate member 7 has flat front end surface 7c that is opposed to the tip end portion of cylindrical portion 6c of first yoke 6 and integrally and rigidly connected with the tip end portion of cylindrical portion 6c in the axial direction of propeller shaft 100 by friction-pressure welding. Also, first flange 7a has a rear end surface that is opposed to a tip end of inner tube 2b of the one end portion of tube member 2.

Second joint 4 has the same construction as that of first joint 3. That is, second yoke 11 is made of an aluminum alloy, and second intermediate member 12 is made of an iron-based metal. Second intermediate member 12 includes second flange 12a that is configured to be the same in shape and diameter as those of first flange 7a of first intermediate member 7.

As explained above, first yoke 6 is made of the aluminum alloy and first intermediate member 7 is made of the iron-based metal. Therefore, first intermediate member 7 has a sufficient rigidity so that the connecting portion between first intermediate member 7 and tube member 2 through the serration coupling can be enhanced in strength. Further, second yoke 11 is made of the aluminum alloy and second intermediate member 12 is made of the iron-based metal. Therefore, second intermediate member 12 has a sufficient rigidity, and the strength of the connecting portion between second intermediate member 12 and tube member 2 through the serration coupling can be increased. Further, first yoke 6 and second yoke 11 which are made of the aluminum alloy are reduced in weight, thereby serving for reducing the weight of propeller shaft 100 as a whole.

Accordingly, it is possible to ensure the increased coupling strength of the connecting portion between the one end portion of tube member 2 and first intermediate member 7 and the connecting portion between the other end portion of tube member 2 and second intermediate member 12 and reduce the total weight of propeller shaft 100. As a result, fuel economy of an internal combustion engine of the vehicle can be improved.

Figure 4:
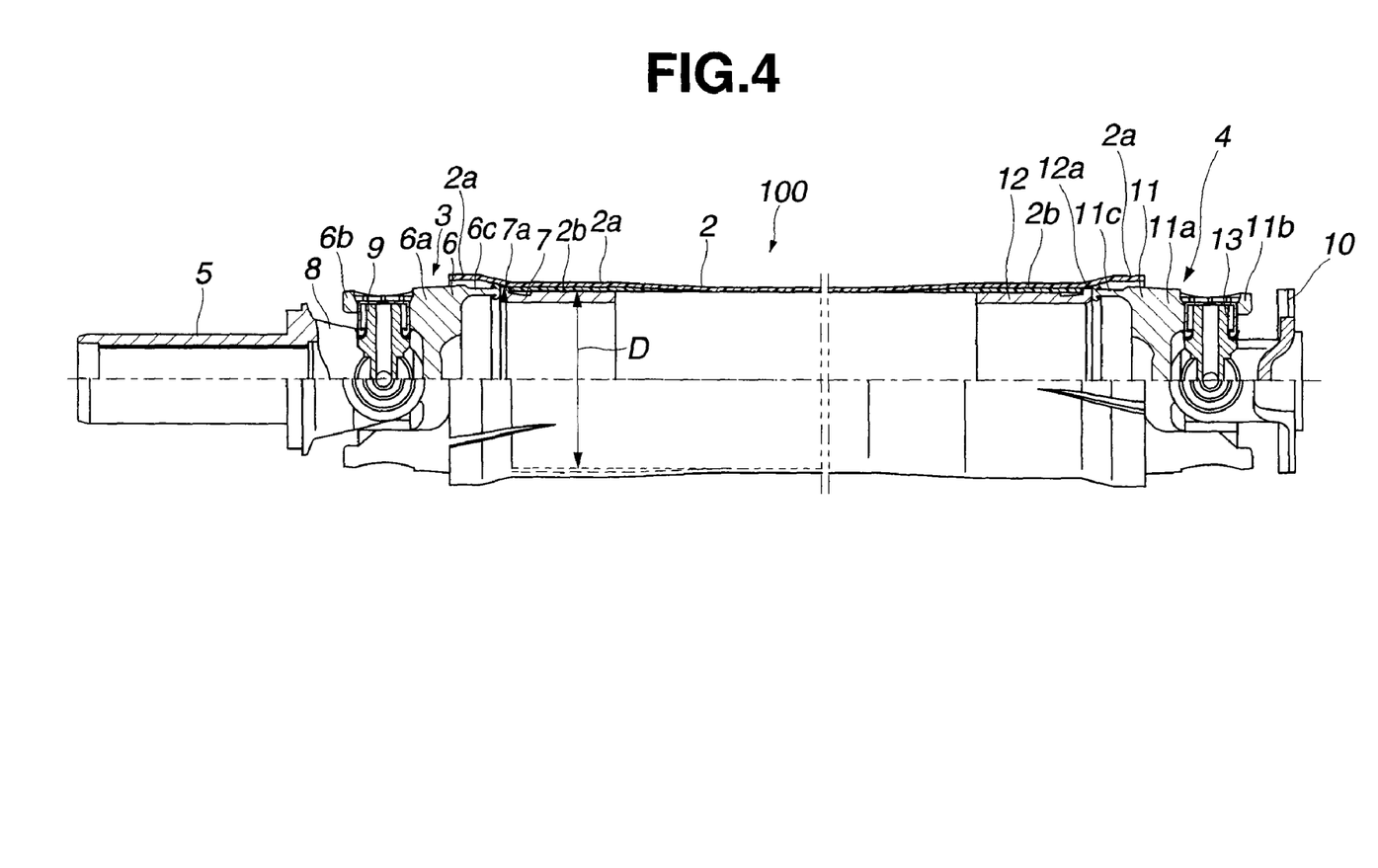
FIG. 4 is an explanatory diagram showing the propeller shaft according to the first embodiment under a condition that an excessive load is applied to the propeller shaft, in which an upper half shows a cross section taken in the longitudinal direction of the propeller shaft.

FIG. 4 shows a state of propeller shaft 100 in which an excessive impact load is applied to propeller shaft 100 mounted to a vehicle body, from a front side (i.e., from the side of the transmission) in the axial direction of propeller shaft 100, for instance, upon collision of the vehicle. As shown in FIG. 4, the tip end surfaces of inner tubes 2b, 2b located at the both end portions of tube member 2 are caused to impinge on the rear end surface of first flange 7a of first intermediate member 7 and a front end surface of second flange 12a of second intermediate member 12, respectively. Inner tubes 2b, 2b are prevented from axial moving thereof by the impingement between the tip end surfaces of inner tubes 2b, 2b of the both end portions of tube member 2 and the rear end surface of first flange 7a and the front end surface of second flange 12a. On the other hand, tip end portions of outer tubes 2a, 2a of the both end portions of tube member 2 are caused to deform in such a direction as to increase the diameter of outer tubes 2a, 2a (that is, in a radially outward direction of outer tubes 2a, 2a), while being forwardly moved beyond flanges 7a and 12a, respectively. The tip end portions of outer tubes 2a, 2a are thus separated or peeled from inner tubes 2b, 2b, and at the same time, the tip end portions of outer tubes 2a, 2a are partly ruptured. As a result, the impact force upon the impingement is absorbed so that a collision shock applied to a passenger in the vehicle can be effectively reduced.

Further, cylindrical portion 6c of first yoke 6 and cylindrical portion 11c of second yoke 11 are configured to have the relatively large diameter, and first flange 7a of first intermediate member 7 and second flange 12a of second intermediate member 12 are configured to have the relatively large diameter. Therefore, when the tip end portions of cylindrical portions 6c and 11c are connected with the end surfaces of flanges 7a and 12 by the friction-pressure welding, respectively, entire friction areas of the respective connecting portions between the tip end portions of cylindrical portions 6c and 11c and the end surfaces of flanges 7a and 12 can be sufficiently increased. Owing to the increased entire friction areas, the coupling strength of the respective connecting portions provided by the friction-pressure welding can be enhanced to thereby attain a rigid connecting state of the respective connecting portions. Further, since the outer diameter of first and second intermediate members 7 and 12 is increased only at first and second flanges 7a and 12a, it is possible to suppress increase in weight of first and second intermediate members 7 and 12 as compared to the case where an outer diameter of the entire intermediate members is increased.

Furthermore, first flange 7a of first intermediate member 7 and second flange 12a of second intermediate member 12 can be formed into the bend shape during press forming of intermediate members 7 and 12. Therefore, the work for formation of first and second flanges 7a and 12a can be readily performed.

Second Embodiment

Figure 5:
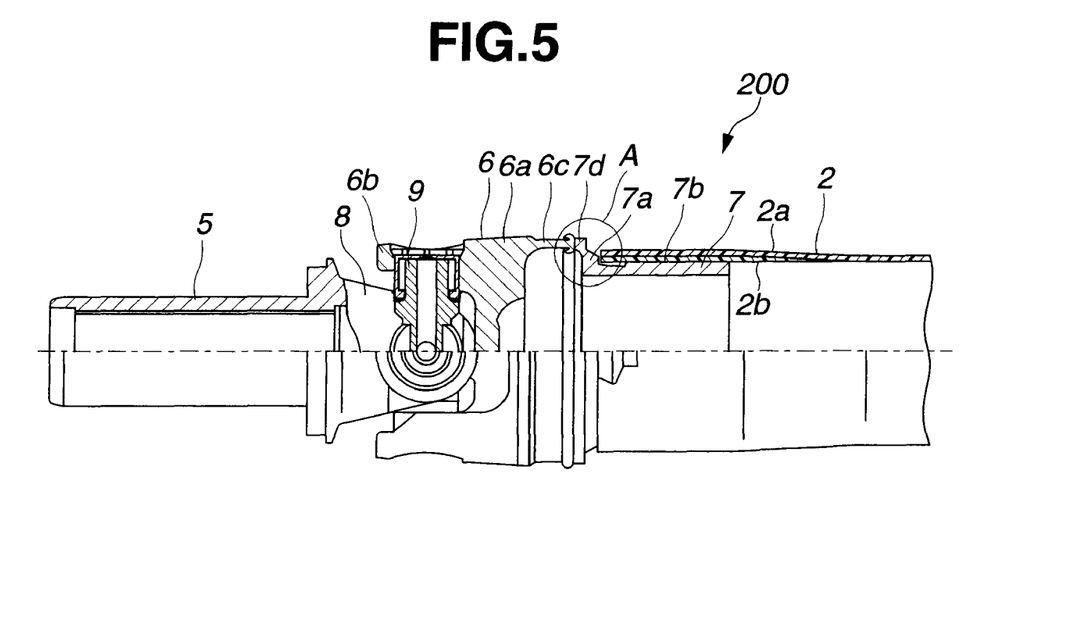
FIG. 5 is a diagram showing an essential part of a propeller shaft according to a second embodiment of the present invention, in which an upper half shows a cross section taken in a longitudinal direction of the propeller shaft.
Figure 6:
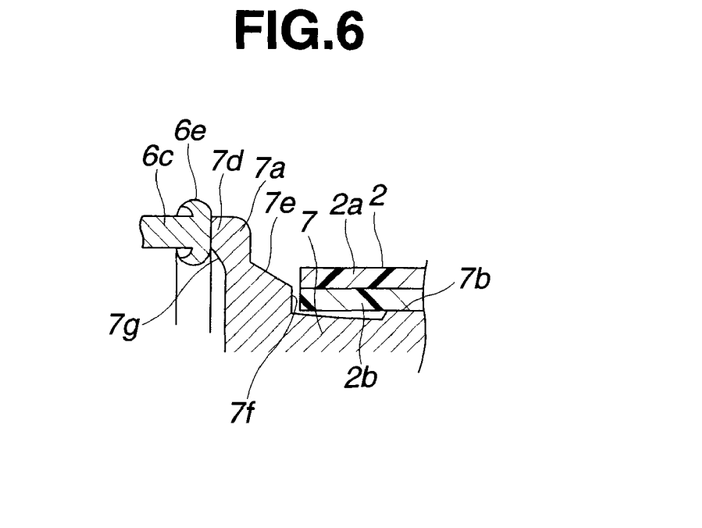
FIG. 6 is an enlarged view of circled part A shown in FIG. 5.
Figure 7:
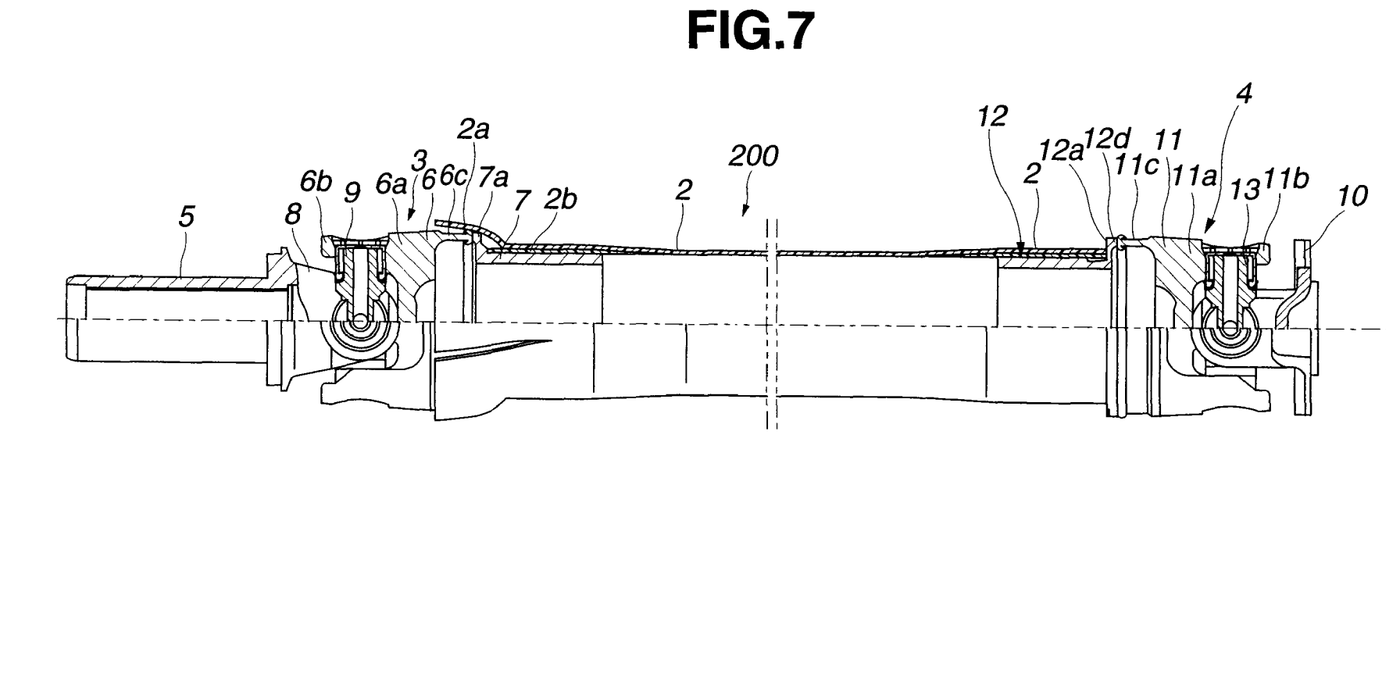
FIG. 7 is an explanatory diagram showing the propeller shaft according to the second embodiment under a condition that an excessive load is applied to the propeller shaft, in which an upper half shows a cross section taken in the longitudinal direction of the propeller shaft.

Referring to FIG. 5 to FIG. 7, propeller shaft 200 according to a second embodiment of the present invention is explained. The second embodiment is similar to the first embodiment in that respective yokes 6 and 11 are made of an aluminum alloy and respective intermediate members 7 and 12 are made of an iron-based metal. The second embodiment differs from the first embodiment in construction of first flange 7a of first intermediate member 7 and second flange 12a of second intermediate member 12. Like reference numerals denote like parts, and therefore, detailed explanations therefor are omitted.

As shown in FIG. 5 and FIG. 6, first flange 7a of first intermediate member 7 includes annular projection 7d that is integrally formed with first flange 7a. Annular projection 7d is disposed on a front end surface of first flange 7a which is located on the side of first yoke 6. Annular projection 7d extends from a radial-outer side of the front end surface of first flange 7a in an axial direction of first intermediate member 7, i.e., in the axial direction of propeller shaft 100. First flange 7a further includes tapered surface (conical surface) 7e that is formed on a side of annular rear end surface 7f of first flange 7a to which the tip end surface of inner tube 2b of tube member 2 is opposed. Tapered surface 7e extends from an outer circumferential side of the tip end of the one end portion of tube member 2 toward a side of the tip end portions of cylindrical portion 6c of first yoke 6 so as to be inclined in the radially outward direction of first intermediate member 7. Specifically, tapered surface 7e is located in a stepped portion that is formed on rear end surface 7f. Tapered surface 7e extends from rear end surface 7f toward the side of the tip end portions of cylindrical portion 6c so as to be inclined relative to rear end surface 7f in the radially outward direction of first intermediate member 7. Tapered surface 7e is opposed to a tip end surface of outer tube 2a of tube member 2 in an axial direction of propeller shaft 200. Rear end surface 7f is opposed to a tip end surface of inner tube 2b of tube member 2 in the axial direction of propeller shaft 200. Annular recess 7g having a generally arcuate section taken in the axial direction of propeller shaft 200 is formed in an inner circumferential portion of annular projection 7d.

Annular projection 7d has a flat front end surface that is opposed to the tip end portion of cylindrical portion 6c of first yoke 6 and integrally connected with the tip end portion of cylindrical portion 6c in the axial direction of propeller shaft 200 by friction-pressure welding.

On the other hand, second flange 12a of second intermediate member 12 has a diameter that is sufficiently larger than the outer diameter of the other end portion of tube member 2 as shown in FIG. 7. Tip end surfaces of outer and inner tubes 2a and 2b of tube member 2 are opposed to a front end surface of second flange 12a in the axial direction of propeller shaft 200. Annular projection 12d is disposed on an outer circumferential side of a rear end surface of second flange 12a and extends in an axial direction of propeller shaft 200. Annular projection 12d is integrally formed with second flange 12a. Annular projection 12d has a flat rear end surface that is opposed to the tip end portion of cylindrical portion 11c of second yoke 11 and rigidly connected with the tip end portion of cylindrical portion 11c in the axial direction of propeller shaft 200 by friction-pressure welding.

In the second embodiment, the same function effect as those of the first embodiment can be performed. That is, it is possible to attain an increased coupling strength of the connecting portion between intermediate members 7 and 11 and tube member 2 and reduce the weight of the entire propeller shaft 200 including respective yokes 6 and 11 made of the aluminum alloy.

Further, when the tip end of cylindrical portion 6c of first yoke 6 and first flange 7a of first intermediate member 7 are connected with each other by friction-pressure welding, annular recess 7g serves as a clearance groove to guide the fusing tip end of cylindrical portion 6c in a radially inward direction of cylindrical portion 6c and form a radially inward curl of curl portion 6e during the friction-pressure welding operation. Therefore, with the provision of annular recess 7g, it is possible to facilitate forming the radially inward curl of curl portion 6e and releasing the frictional heat generated by the friction-pressure welding through annular recess 7g. As a result, the friction-pressure welding work can be efficiently performed and the coupling strength of the connecting portion between the tip end of cylindrical portion 6c of first yoke 6 and first flange 7a can be further increased.

Further, when an excessive load is applied to propeller shaft 200 in the axial direction at the occurrence of collision of the vehicle, the tip end surfaces of outer and inner tubes 2a and 2b of the other end portion of tube member 2 are caused to impinge on the front end surface of second flange 12a of second intermediate member 12 of second joint 4 in the axial direction as shown in FIG. 7. Tube member 2 can be prevented from undergoing axial displacement thereof by the abutment between the tip end surfaces of outer and inner tubes 2a and 2b and the front end surface of second flange 12a.

In contrast, under the same condition as described above at the occurrence of the vehicle collision, inner tube 2b of the one end portion of tube member 2 is caused to impinge on annular surface 7f of first intermediate member 7 of first joint 3 in the axial direction of propeller shaft 200, whereas outer tube 2a of the one end portion of tube member 2 is caused to radially outwardly deform along tapered surface 7e upon the impingement of inner tube 2b and move beyond first flange 7a to thereby be separated or peeled from inner tube 2b and partly ruptured. As a result, the impact force upon the impingement is absorbed so that a collision shock to a passenger in the vehicle can be effectively reduced. Particularly, since outer tube 2a of the one end portion of tube member 2 is guided by tapered surface 7e, the radially outward deformation of outer tube 2a can be smoothly performed, thereby facilitating the impact force absorption.

Third Embodiment

Figure 8:
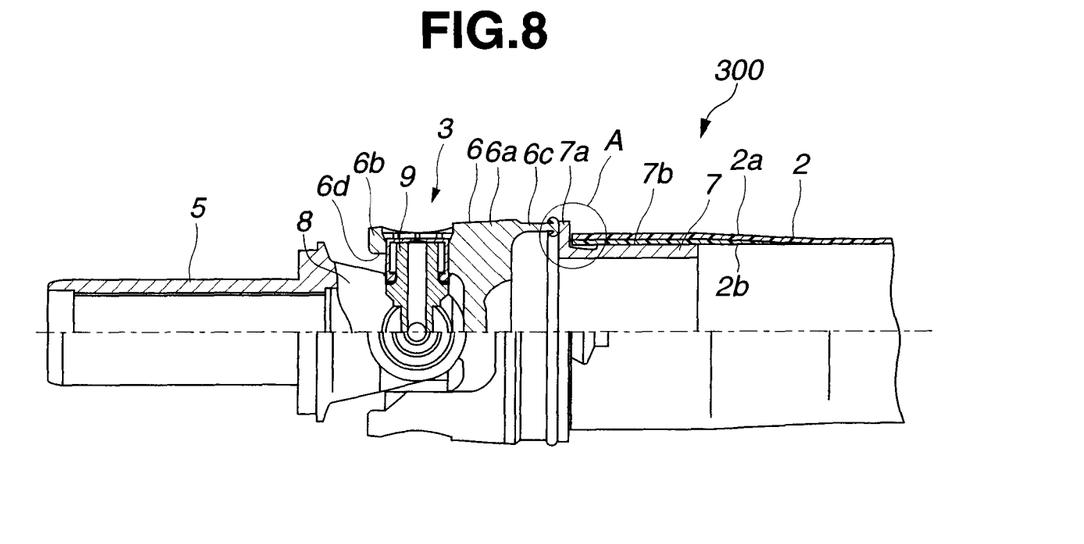
FIG. 8 is a diagram showing an essential part of a propeller shaft according to a third embodiment of the present invention, in which an upper half shows a cross section taken in a longitudinal direction of the propeller shaft.
Figure 9:
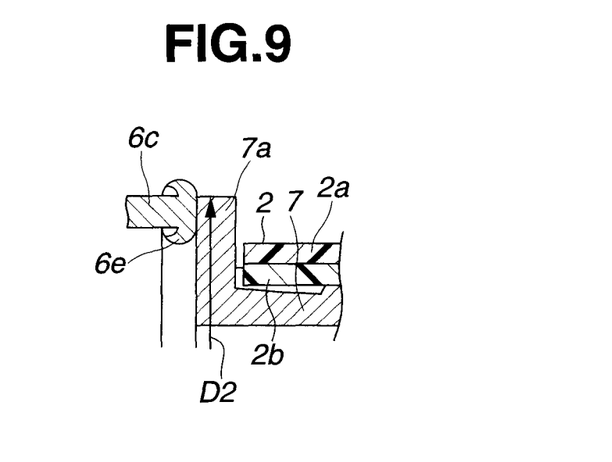
FIG. 9 is an enlarged view of circled part A shown in FIG. 8.

Referring to FIG. 8 and FIG. 9, propeller shaft 300 according to a third embodiment of the present invention is explained. The third embodiment has substantially the same construction as that of the first embodiment, but differs from the first and second embodiments in that an outer diameter of first flange 7a of first intermediate member 7 is not smaller than an outer diameter of tube member 2. The third embodiment further differs from the first and second embodiments in that an outer diameter of cylindrical portion 6c of first yoke 6 of first joint 3 is substantially the same as the outer diameter of first flange 7a.

As shown in FIG. 9, first flange 7a has outer diameter D2 larger than the outer diameter of tube member 2. Further, the outer diameter of cylindrical portion 6c of first yoke 6 is substantially equal to outer diameter D2 of first flange 7a. In this embodiment, tube member 2 may have a single layer structure instead of the two-layer structure of the first embodiment.

Second flange 12a of second intermediate member 12 of second joint 4 is formed into an optional shape. For instance, second flange 12a can be formed into the same shape as that of either the first embodiment or the second embodiment, or the same shape as that of first flange 7a of this embodiment.

In the third embodiment, owing to the increased outer diameters of first flange 7a of first intermediate member 7 and cylindrical portion 6c of first yoke 6, a contact area in which the front end surface of first flange 7a and the tip end portion of cylindrical portion 6c are in contact with each other can be increased. As a result, the coupling strength of the connecting portion at which first flange 7a and the tip end portion of cylindrical portion 6c are connected with each other by the friction-pressure welding is further enhanced. In addition, the third embodiment can perform the same function and effect of those of the first and second embodiments.

Fourth Embodiment

Figure 10:
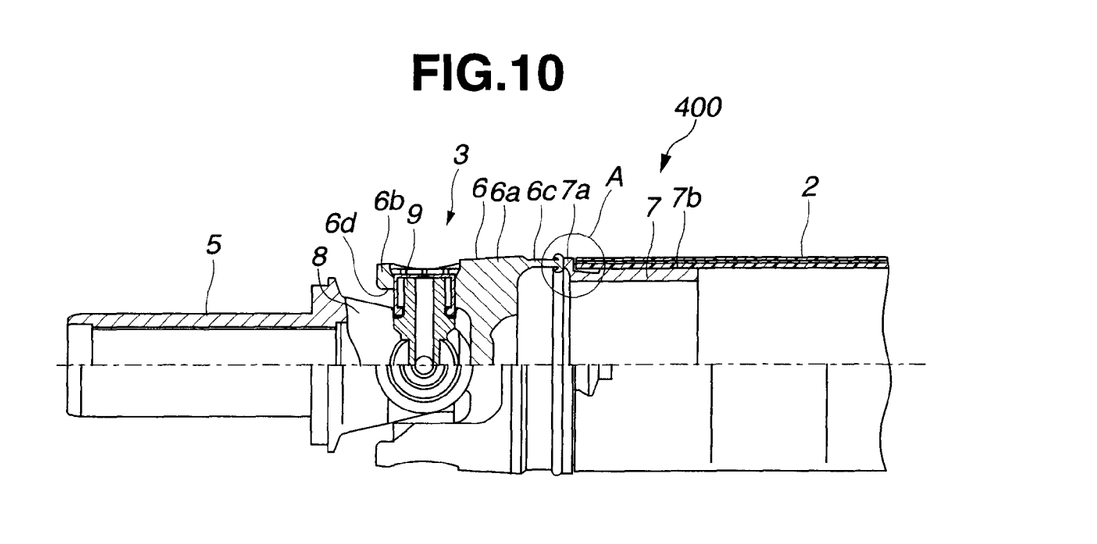
FIG. 10 is a diagram showing an essential part of a propeller shaft according to a fourth embodiment of the present invention, in which an upper half shows a cross section taken in a longitudinal direction of the propeller shaft.
Figure 11:
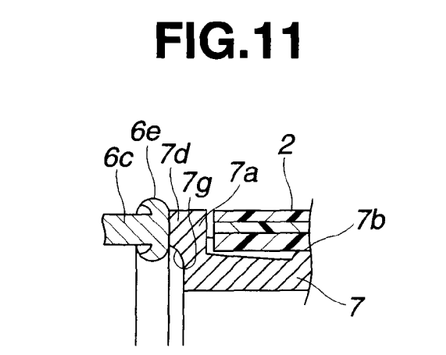
FIG. 11 is an enlarged view of circled part A shown in FIG. 10.

Referring to FIG. 10 and FIG. 11, propeller shaft 400 according to a fourth embodiment of the present invention is explained. The fourth embodiment differs from the first embodiment in construction of tube member 2 and provision of annular projection 7d on first flange 7a. Other structural features of the fourth embodiment is similar to those of the first embodiment.

As shown in FIG. 10 and FIG. 11, tube member 2 has a three-layer structure constituted of an outer tube, an inner tube and an intermediate tube between the outer and inner tubes, and first flange 7a has annular projection 7d on the front end surface thereof. Annular projection 7d is integrally formed with first flange 7a and extends from an outer circumferential side of the front end surface of first flange 7a in the axial direction of propeller shaft 400. Annular recess 7g is formed in an inner circumferential portion of annular projection 7d. Annular recess 7g has a generally arcuate shape in section taken along the axial direction of propeller shaft 400.

In the fourth embodiment, when the tip end of cylindrical portion 6c of first yoke 6 and first flange 7a of first intermediate member 7 are connected with each other by friction-pressure welding, annular recess 7g serves as a clearance groove to guide the fusing tip end of cylindrical portion 6c in a radially inward direction of cylindrical portion 6c and form a radially inward curl of curl portion 6e during the friction-pressure welding operation. Therefore, with the provision of annular recess 7g, it is possible to facilitate forming the radially inward curl of curl portion 6e and releasing the frictional heat generated by the friction-pressure welding through annular recess 7g. As a result, the friction-pressure welding work can be efficiently performed and the coupling strength of the connecting portion between the tip end of cylindrical portion 6c of first yoke 6 and first flange 7a can be further increased.

Further, in this embodiment, owing to the three-layer structure of tube member 2, the rigidity of tube member 2 can be increased.

Fifth Embodiment

Figure 12:
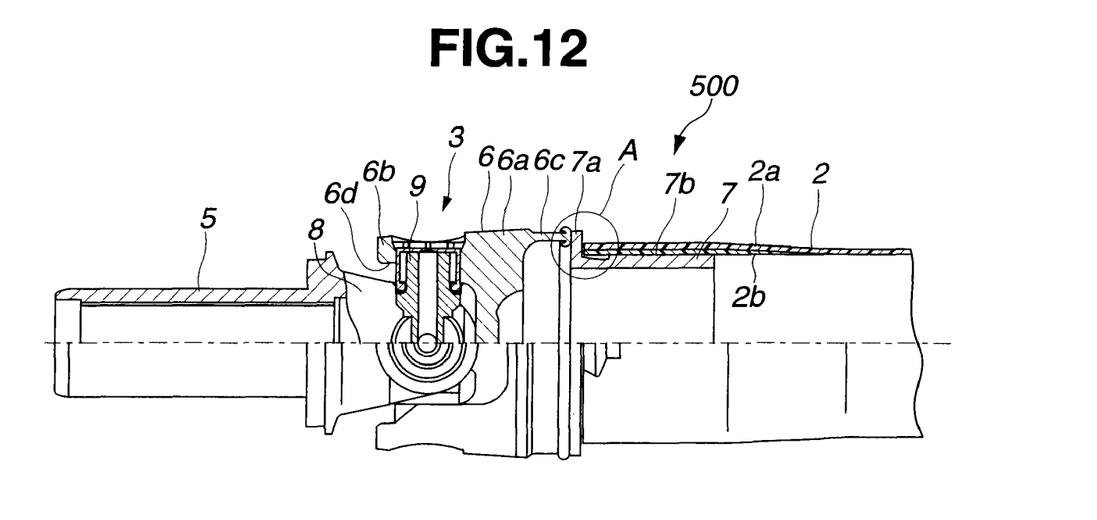
FIG. 12 is a diagram showing an essential part of a propeller shaft according to a fifth embodiment of the present invention, in which an upper half shows a cross section taken in a longitudinal direction of the propeller shaft.
Figure 13:
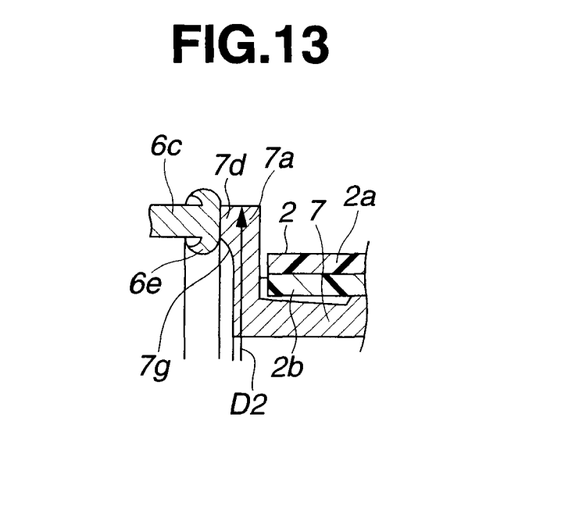
FIG. 13 is an enlarged view of circled part A shown in FIG. 12.

Referring to FIG. 12 and FIG. 13, propeller shaft 500 according to a fifth embodiment of the present invention is explained. The fifth embodiment differs from the first embodiment in that an outer diameter of first flange 7a of first intermediate member 7 is sufficiently increased as compared to that of the first embodiment, and annular projection 7d is formed on the front end surface of first flange 7a. Further, the fifth embodiment differs from the first embodiment in that an outer diameter of cylindrical portion 6c of first yoke 6 is substantially the same as an outer diameter of annular projection 7d of first flange 7a.

As shown in FIG. 13, first flange 7a has outer diameter D2 that is considerably increased as compared to the outer diameter of tube member 2 and the outer diameters of first flanges 7a of the first and second embodiments shown in FIGS. 2 and 6. Annular projection 7d is integrally formed with first flange 7a and extends from an outer circumferential side of the front end surface of first flange 7a in the axial direction of propeller shaft 500. Annular recess 7g having a generally arcuate section is formed in an inner circumferential portion of annular projection 7d. Further, the outer diameter of cylindrical portion 6c of first yoke 6 is substantially equal to the outer diameter of annular projection 7d of first flange 7a.

Tube member 2 has the two-layer structure in this embodiment, but tube member 2 may have a single layer structure. Other structural features of the fifth embodiment is similar to those of the first embodiment.

In the fifth embodiment, owing to the increased outer diameters of first flange 7a of first intermediate member 7 and cylindrical portion 6c of first yoke 6, a contact area in which the front end surface of first flange 7a and the tip end portion of cylindrical portion 6c are in contact with each other can be increased. As a result, the coupling strength of the connecting portion at which first flange 7a and the tip end portion of cylindrical portion 6c are connected with each other by the friction-pressure welding is further enhanced.

Further, with the provision of annular recess 7g, formation of the radially inward curl of curl portion 6e can be facilitated, and the frictional heat generated by the friction-pressure welding can be effectively released through annular recess 7g, thereby improving the coupling strength of the connecting portion between the tip end portion of cylindrical portion 6c of first yoke 6 and first flange 7a.

Sixth Embodiment

Figure 14:
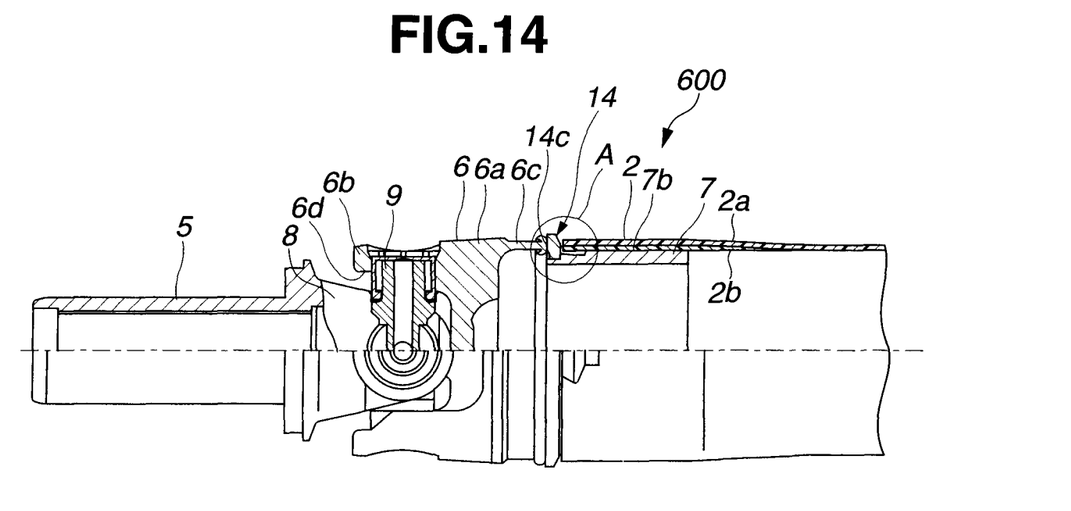
FIG. 14 is a diagram showing an essential part of a propeller shaft according to a sixth embodiment of the present invention, in which an upper half shows a cross section taken in a longitudinal direction of the propeller shaft.
Figure 15:
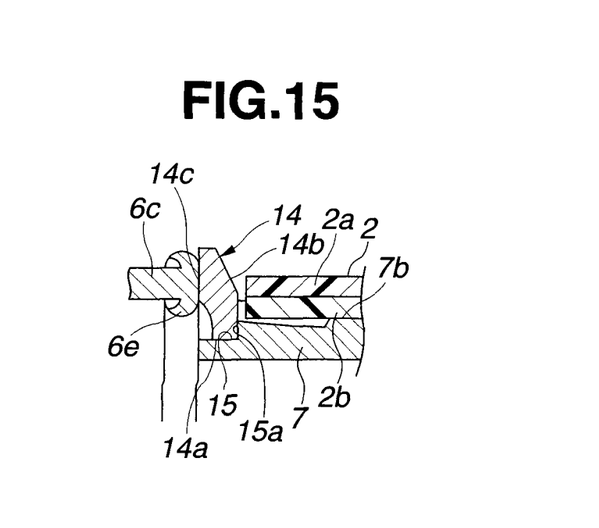
FIG. 15 is an enlarged view of circled part A shown in FIG. 14.

Referring to FIG. 14 and FIG. 15, propeller shaft 600 according to a sixth embodiment of the present invention is explained. The sixth embodiment differs from the first embodiment in that flange member 14 is provided as a separate body independent of first intermediate member 7.

First intermediate member 7 has a generally cylindrical shape and made of iron. As shown in FIG. 15, fitting groove 15 that is formed on an outer circumferential surface of the front end portion of first intermediate member 7. Serration portion 7b is formed along the axial direction of first intermediate member 7 on the outer circumferential surface of first intermediate member 7 except for fitting groove 15 and a periphery of fitting groove 15. Serration portion 7b is spaced from fitting groove 15 in the axial direction of first intermediate member 7.

Flange member 14 is made of iron and formed into an annular shape. Flange member 14 has an outer diameter larger than an outer diameter of the tip end portion of cylindrical portion 6c of first yoke 6 which is connected to flange member 14. Flange member 14 has large-diameter fitting hole 14a that is defined by an inner circumferential surface of flange member 14. The inner circumferential surface of flange member 14 is engaged in fitting groove 15 of first intermediate member 7. Further, flange member 14 has tapered surface 14b that extends between a rear end surface of flange member 14 and an outer circumferential surface of flange member 14. Tapered surface 14b is inclined with respect to the rear end surface of flange member 14 toward a side of the tip end portion of cylindrical portion 6c of first yoke 6. Tapered surface 14b is opposed to the tip end surface of outer tube 2a of tube member 2. Flange member 14 has front end surface 14c that is located on an opposite side of the rear end surface and tapered surface 14b. Front end surface 14c is formed into a flat plane and connected with the tip end of cylindrical portion 6c of first yoke 6 by friction-pressure welding. Tube member 2 has the two-layer structure similar to that of the first embodiment, but may have a single layer structure. Other structural features of the sixth embodiment is similar to those of the first embodiment.

In the sixth embodiment, flange member 14 is press-fitted to fitting groove 15 of first intermediate member 7 through fitting hole 14a until an inner circumferential side of the rear end surface of flange member 14 which is located around fitting hole 14a abuts on stepped surface 15a of first intermediate member 7 which defines fitting groove 15. By the abutment of flange member 14 on stepped surface 15a, flange member 14 can be prevented from further axially moving by press-fitting and can be surely fixed in the axial position relative to the first intermediate member 7.

Further, since first intermediate member 7 is formed into the cylindrical shape as a whole and fitting groove 15 is formed into a stepped portion by simply cutting from the outer circumferential side of the front end portion of first intermediate member 7, the work for formation of first intermediate member 7 and fitting groove 15 can be facilitated.

Further, flange member 14 is formed as a separate body independent of first intermediate member 7, and therefore, it is possible to increase freedom of varying an outer diameter and a thickness of flange member 14.

Further, when an excessive load is applied to propeller shaft 600 in the axial direction, outer tube 2a of the one end portion of tube member 2 is caused to radially outwardly deform along tapered surface 14b of flange member 14 and move beyond flange member 14, so that outer tube 2a is separated from inner tube 2b and partly ruptured. As a result, effective absorption of the load can be attained.

Seventh Embodiment

Figure 16:
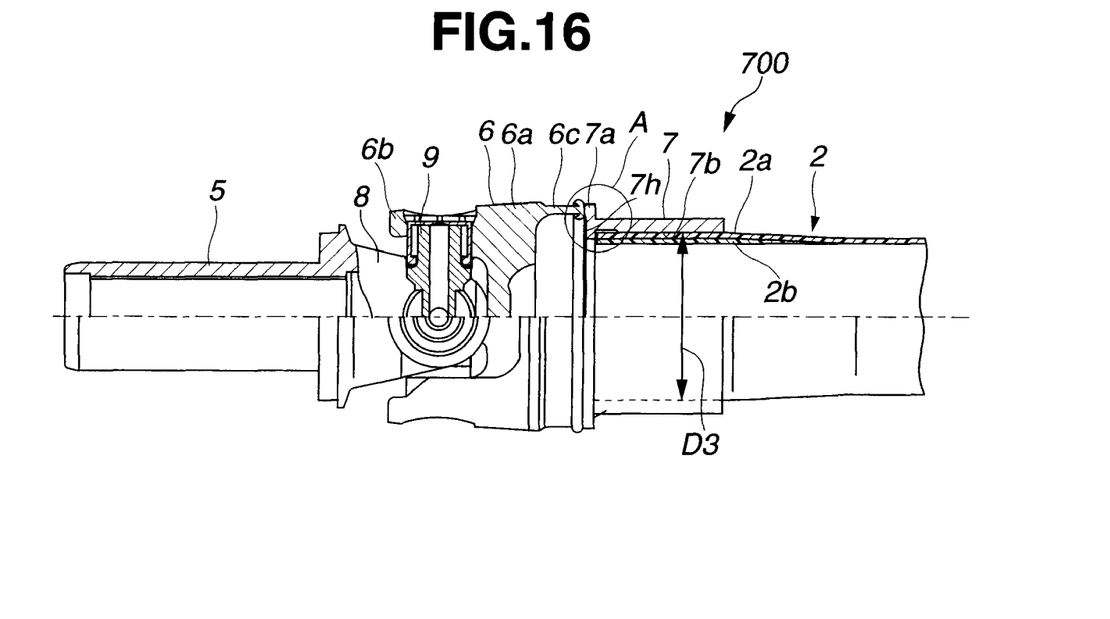
FIG. 16 is a diagram showing an essential part of a propeller shaft according to a seventh embodiment of the present invention, in which an upper half shows a cross section taken in a longitudinal direction of the propeller shaft.
Figure 17:
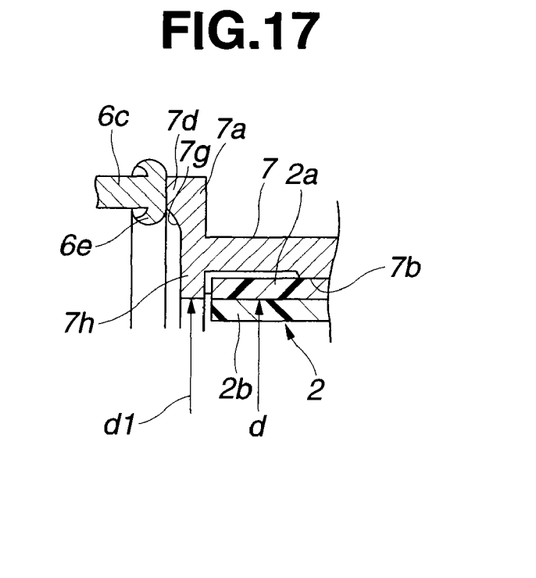
FIG. 17 is an enlarged view of circled part A shown in FIG. 16.

Referring to FIG. 16 and FIG. 17, propeller shaft 700 according to a seventh embodiment of the present invention is explained. The seventh embodiment differs from the fifth embodiment in construction of first intermediate member 7 and arrangement of the serration coupling between first intermediate member 7 and the one end portion of tube member 2.

As shown in FIG. 17, serration portion 7b is formed on an inner circumferential surface of first intermediate member 7 in the axial direction of first intermediate member 7. An outer diameter of the one end portion of tube member 2 is slightly larger than inner diameter D3 shown in FIG. 16, of first intermediate member 7. The one end portion of tube member 2 is press-fitted into first intermediate member 7 in the axial direction of propeller shaft 700 and connected to first intermediate member 7 through serration coupling between an outer circumferential surface of tube member 2 (i.e., an outer circumferential surface of outer tube 2a) and serration portion 7b of first intermediate member 7. Thus, the one end portion of tube member 2 and first intermediate member 7 are connected to each other through the serration coupling.

First intermediate member 7 includes annular projection 7h on the inner circumferential surface thereof. Annular projection 7h extends from the inner circumferential surface of first intermediate member 7 in the radially inward direction of first intermediate member 7 and is opposed to the one end portion of tube member 2. Annular projection 7h is integrally formed with first intermediate member 7. Inner diameter d1 of annular projection 7h is substantially equal to outer diameter d of inner tube 2b of the one end portion of tube member 2.

In the seventh embodiment, since the inner circumferential surface of first intermediate member 7 and an outer circumferential surface of the one end portion of tube member 2 are connected with each other through the serration coupling, first flange 7a is not opposed to a tip end of the one end portion of tube member 2 in the axial direction of propeller shaft 700. Therefore, a freedom of dimensional design of first flange 7a can be increased. For instance, both the outer diameter of first flange 7a and the outer diameter of cylindrical portion 6c of first yoke 6 can be increased. In such a case, the contact area in which the front end surface of first flange 7a and the tip end portion of cylindrical portion 6c are in contact with each other can be increased to thereby further enhance the coupling strength upon friction-pressure welding.

When an excessive load is applied to propeller shaft 700 in the axial direction, a tip end of outer tube 2a of the one end portion of tube member 2 is impinged on a rear surface of annular projection 7h of first intermediate member 7, while inner tube 2b is caused to move beyond a radial-inner end of annular projection 7h and separated or peeled from outer tube 2a. As a result, effective absorption of the load can be attained.

Further, similar to the fourth embodiment, first flange 7a has annular projection 7d on the front end surface thereof. Annular projection 7d is integrally formed with first flange 7a and extends from an outer circumferential side of the front end surface of first flange 7a in the axial direction of propeller shaft 700. Annular recess 7g is formed in an inner circumferential portion of annular projection 7d. Annular recess 7g has a generally arcuate shape in section taken along the axial direction of propeller shaft 700.

With the provision of annular recess 7g formed on annular projection 7d, when the tip end of cylindrical portion 6c of first yoke 6 and first flange 7a of first intermediate member 7 are connected with each other by friction-pressure welding, annular recess 7g serves as a clearance groove to guide the fusing tip end of cylindrical portion 6c in a radially inward direction of cylindrical portion 6c and form a radially inward curl of curl portion 6e during the friction-pressure welding operation. Therefore, with the provision of annular recess 7g, it is possible to facilitate forming the radially inward curl of curl portion 6e and releasing the frictional heat generated by the friction-pressure welding through annular recess 7g. As a result, the friction-pressure welding work can be efficiently performed and the coupling strength of the connecting portion between the tip end of cylindrical portion 6c of first yoke 6 and first flange 7a can be further increased.

Eighth Embodiment

Figure 18:
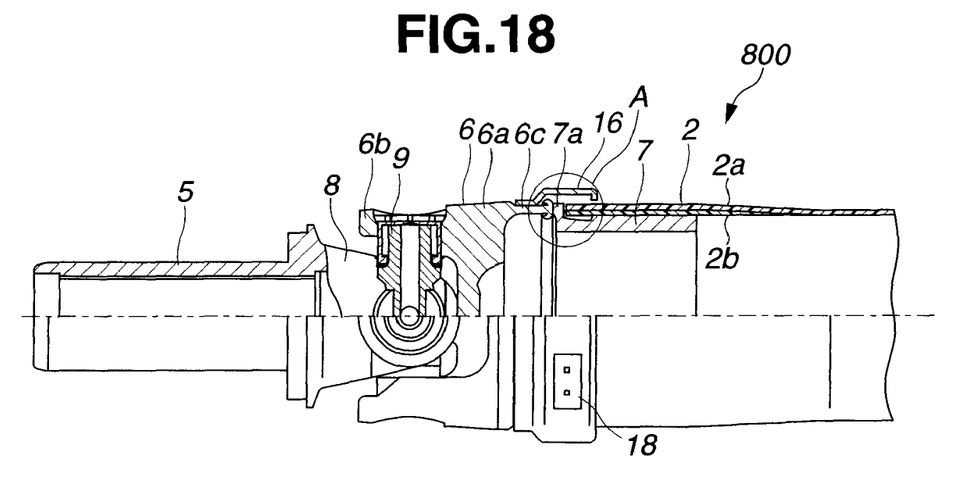
FIG. 18 is a diagram showing an essential part of a propeller shaft according to an eighth embodiment of the present invention, in which an upper half shows a cross section taken in a longitudinal direction of the propeller shaft.
Figure 19:
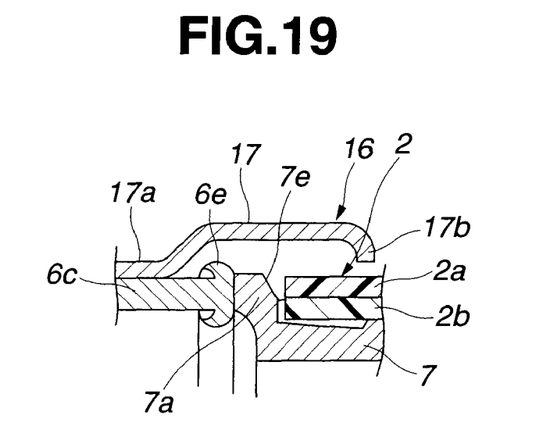
FIG. 19 is an enlarged view of circled part A shown in FIG. 18.

Referring to FIG. 18 and FIG. 19, propeller shaft 800 according to an eighth embodiment of the present invention is explained. The eighth embodiment is similar to the second embodiment in provision of tapered surface 7e of first intermediate member 7, but differs from the second embodiment in provision of rotary balance mechanism 16 that extends over cylindrical portion 6c of first yoke 6 and first flange 7a of first intermediate member 7.

As shown in FIG. 19, rotational balance mechanism 16 includes cylindrical retainer 17 and a plurality of balance pieces 18 fixed to an outer circumferential surface of the cylindrical retainer 17. Retainer 17 has base portion 17a that is press-fitted onto an outer circumferential surface of cylindrical portion 6c of first yoke 6, and expansion portion 17b that expands from base portion 17a in a radially outward direction of retainer 17. Expansion portion 17b extends in an axial direction of propeller shaft 800 so as to cover the tip end portion of cylindrical portion 6c, first flange 7a of first intermediate member 7 and a tip end side of the one end portion of tube member 2, and is bent at a tip end thereof in a radially inward direction of retainer 17. Retainer 17 is made of an iron-based metal Balance pieces 18 are secured to a predetermined circumferential position on the outer circumferential surface of retainer 17 by projection welding. Balance pieces 18 are made of an iron-based metal and formed into a generally rectangular plate-shape. Other structural features of the eighth embodiment is similar to those of the second embodiment.

The eighth embodiment can perform the same function and effect as explained in the above embodiments. In addition, in the eighth embodiment, rotational balance mechanism 16 can be provided on cylindrical portion 6c of first yoke 6 which serves as an optimal portion for attaining rotational balance of propeller shaft 800. Therefore, with the arrangement of rotational balance mechanism 16, the rotational balance can be ensured, and a freedom of layout of rotational balance mechanism 16 can be improved.

Further, since retainer 17 is arranged so as to cover the connecting portion between the tip end portion of cylindrical portion 6c of first yoke 6 and first flange 7a of first intermediate member 7, it is possible to suppress adhesion of mud water to the connecting portion and thereby prevent the connecting portion from suffering from rusting.

The construction of first flange 7a and second flange 12a is not limited to the above embodiments and can be optionally modified. Further, the method of connecting first and second flanges 7a and 12a with the tip end portion of cylindrical portion 6c of first yoke 6 and the tip end portion of cylindrical portion 11c of second yoke 11, respectively, is not limited to the friction-pressure welding in the above embodiments, and other connecting methods, for instance, diffusion welding, can be used.

As explained above, the vehicular propeller shaft (i.e., the power transmitting shaft) of the present invention includes a coupling member (i.e., a yoke) made of a light metal such as an aluminum alloy, and a cylindrical intermediate member with a flange-shaped increased diameter portion which is made of an iron-based metal. The increased diameter portion of the intermediate member and an end portion of the coupling member are connected with each other by a suitable method, for instance, friction-pressure welding. Further, the intermediate member has a serration portion on an outer circumferential surface thereof through which one end portion of a tube member is connected to the intermediate member.

Since the intermediate member is made of the iron-based metal, a sufficient rigidity of the intermediate member can be obtained as compared to an intermediate member made of an aluminum alloy. Therefore, a strength of the connecting portion between the intermediate member and the one end portion of the tube member can be increased. On the other hand, the coupling member (i.e., the yoke) is made of the light metal, thereby serving for effectively reducing a weight of the propeller shaft (i.e., the power transmitting shaft). Accordingly, it is possible to ensure a high rigidity of the connecting portion between the intermediate member and the one end portion of the tube member and reduce the weight of the entire propeller shaft. As a result, fuel economy of an internal combustion engine employing the propeller shaft can be enhanced.

This application is based on a prior Japanese Patent Application No. 2008-132598 filed on May 21, 2008. The entire contents of the Japanese Patent Application No. 2008-132598 are hereby incorporated by reference.

Although the invention has been described above by reference to certain embodiments of the invention and modifications of the embodiments, the invention is not limited to the embodiments and modifications described above. Further variations of the embodiments and modifications described above will occur to those skilled in the art in light of the above teachings. The scope of the invention is defined with reference to the following claims.

What is claimed is:

1. A power transmitting shaft comprising:
a coupling member that is connected to a counterpart;
a cylindrical intermediate member that is disposed on a side of one end of the coupling member and has a mechanical strength larger than that of the coupling member;
a tube member having one end portion that is connected to either one of an inner circumferential portion of the intermediate member and an outer circumferential portion of the intermediate member; and
an increased diameter portion that is disposed on one end portion of the intermediate member which is opposed to the one end of the coupling member in an axial direction of the power transmitting shaft, the increased diameter portion being connected with the one end of the coupling member in the axial direction,
wherein the increased diameter portion is formed by a flange,
wherein the tube member includes opposite end portions in an axial direction of the tube member, and at least one of the opposite end portions has a tip end that is opposed to one end surface of the flange so as to come into impingement on the one end surface of the flange, and
wherein the tube member has at least two-layer structure constituted of an outer tube and an inner tube, the tube member is made of a fiber-reinforced plastic material, and an outer diameter of the flange is not larger than an inner diameter of an outer-most layer of the tube member.

2. The power transmitting shaft as claimed in claim 1, wherein the intermediate member is made of an iron-based metal and the coupling member is made of an aluminum alloy.

3. The power transmitting shaft as claimed in claim 1, wherein the coupling member and the flange are connected with each other through friction-pressure welding.

4. The power transmitting shaft as claimed in claim 3, wherein the flange includes an annular projection integrally formed with the flange, the annular projection extends in the axial direction, and the annular projection and the coupling member are integrally connected with each other in the axial direction.

5. The power transmitting shaft as claimed in claim 3, wherein the flange includes a tapered surface that is disposed on a side of the one end surface of the flange to which a tip end of the one end portion of the tube member is opposed in the axial direction, and the tapered surface extends from an outer circumferential side of a tip end of the one end portion of the tube member toward the side of the one end of the coupling member so as to be inclined in a radially outward direction of the intermediate member.

6. A propeller shaft comprising:
a yoke that is made of an aluminum alloy;
a tube member;
a cylindrical intermediate member that is disposed between the yoke and the tube member and made of an iron-based metal;
a flange that is disposed on a side of one end of the intermediate member which is located on a side of the yoke; and
a serration portion that is formed on the intermediate member, the tube member being coupled to the intermediate member through the serration portion,
wherein the flange is integrally connected with a tip end of the yoke which is located on a side of the intermediate member, in an axial direction of the propeller shaft by friction-pressure welding or diffusion welding,
wherein the serration portion is formed on an outer circumferential surface of the intermediate member, and the tube member is press-fitted onto the intermediate member in the axial direction and connected to the intermediate member through serration coupling between an inner circumferential surface of the tube member and the serration portion of the intermediate member,
wherein the tube member has an axial end surface that is opposed to one end surface of the flange, and
wherein the tube member has at least two-layer structure constituted of an outer tube and an inner tube and is made of a fiber-reinforced plastic material, the flange has an outer diameter that is not larger than an outer diameter of the inner tube of the tube member, and the inner tube of the tube member has an axial end surface that is opposed to the flange.

7. The propeller shaft as claimed in claim 6, wherein the tube member is configured such that when an excessive load is applied to the tube member in the axial direction, the axial end surface of the inner tube of the tube member is impinged on the flange and separated from the outer tube.

8. The propeller shaft as claimed in claim 6, wherein the flange includes an annular projection that extends toward the yoke in the axial direction, and the annular projection and the yoke are integrally connected with each other in the axial direction.

* * * * *